US012613983B2

(12) United States Patent
Baskar et al.

(10) Patent No.: US 12,613,983 B2
(45) Date of Patent: Apr. 28, 2026

(54) TECHNIQUES FOR CREATING SNAPSHOTS AND PERFORMING RECOVERY OF A HARDWARE SECURITY MODULE

(71) Applicant: Oracle International Corporation, Redwood Shores, CA (US)

(72) Inventors: Rakesh Ganimini Baskar, Bellevue, WA (US); David Rahmany, Seattle, WA (US); Hanyue Zhang, Seattle, WA (US); Andy Kwan Jin Siow, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 81 days.

(21) Appl. No.: 18/829,919

(22) Filed: Sep. 10, 2024

(65) Prior Publication Data

US 2025/0258934 A1 Aug. 14, 2025

Related U.S. Application Data

(60) Provisional application No. 63/551,794, filed on Feb. 9, 2024, provisional application No. 63/553,460, filed (Continued)

(51) Int. Cl.
*G06F 21/00* (2013.01)
*G06F 11/1446* (2026.01)
(Continued)

(52) U.S. Cl.
CPC ........ *G06F 21/602* (2013.01); *G06F 11/1451* (2013.01); *G06F 21/64* (2013.01)

(58) Field of Classification Search
None
See application file for complete search history.

(56) References Cited

U.S. PATENT DOCUMENTS 10,496,283 B2    12/2019   Waghulde
11,199,985 B2    12/2021   Aldred et al.
(Continued)

FOREIGN PATENT DOCUMENTS

BR    112017016047 B1  *  6/2024
WO      2021061173 A1     4/2021

OTHER PUBLICATIONS

"Managed HSM Disaster Recovery", Available Online at: https://learn.microsoft.com/en-us/azure/key-vault/managed-hsm/disaster-recovery-guide, Feb. 20, 2024, 3 pages.
(Continued)

*Primary Examiner* — Andrew J Steinle
(74) *Attorney, Agent, or Firm* — Kilpatrick Townsend & Stockton LLP

(57) ABSTRACT

Techniques are described for creating snapshots and performing recovery of a hardware security module (HSM) using write-ahead logs (WALs) in a cloud infrastructure. In some embodiments, any changes to a crypto key in an HSM partition may be stored in a temporary storage (e.g., a write-ahead log (WAL)). Snapshots for the HSM partition can be created from the temporary storage. The process of creating the snapshots may be performed in parallel with the process of making changes to the crypto keys in the HSM partition. In further embodiments, the snapshots for the HSM partition are chained together to form a multi-version snapshot linked list to become portable snapshot files. In some embodiments, creating the snapshots and restoring the crypto keys in the snapshots follow the same security boundary.

20 Claims, 9 Drawing Sheets

Related U.S. Application Data on Feb. 14, 2024, provisional application No. 63/653, 068, filed on May 29, 2024.

(51) Int. Cl.
  *G06F 21/60*        (2013.01)
  *G06F 21/64*        (2013.01)

(56)                References Cited

U.S. PATENT DOCUMENTS

| | | |
|---|---|---|
| 2022/0100883 A1 | 3/2022 | Leshinsky et al. |
| 2022/0382637 A1 | 12/2022 | Balasubramanian et al. |
| 2023/0060559 A1* | 3/2023 | Wright .................. H04L 9/3239 |

OTHER PUBLICATIONS

"Managing AWS CloudHSM Backups", Amazon Web Services, Inc., Available Online at: https://docs.aws.amazon.com/cloudhsm/latest/userguide/manage-backups.html, 2024, 2 pages.

"Partition Snapshot Restoration Guide", Available Online at: https://thalesdocs.com/dpod/resources/service_resources/partition_snapshot_restore/index.html, 1 page.

De Souza et al., "Audit and Backup Procedures for Hardware Security Modules", Available Online at: https://www.researchgate.net/publication/221190722_Audit_and_backup_procedures_for_Hardware_Security_Modules, Mar. 2008, 9 pages.

* cited by examiner

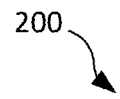

200

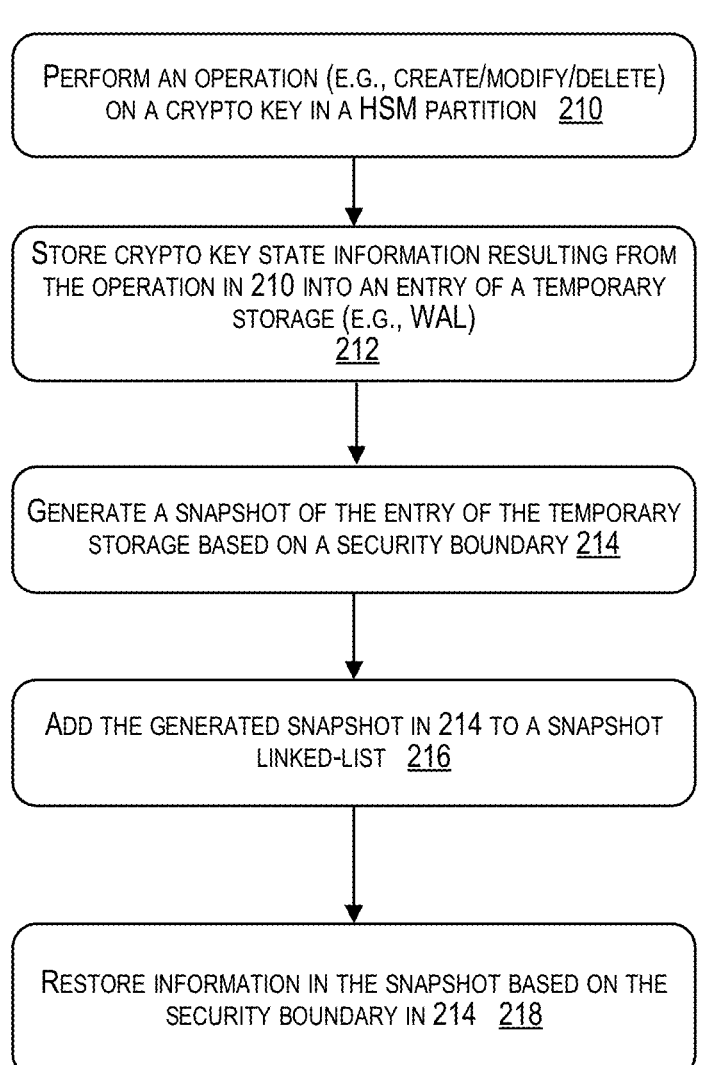

PERFORM AN OPERATION (E.G., CREATE/MODIFY/DELETE) ON A CRYPTO KEY IN A HSM PARTITION 210

STORE CRYPTO KEY STATE INFORMATION RESULTING FROM THE OPERATION IN 210 INTO AN ENTRY OF A TEMPORARY STORAGE (E.G., WAL) 212

GENERATE A SNAPSHOT OF THE ENTRY OF THE TEMPORARY STORAGE BASED ON A SECURITY BOUNDARY 214

ADD THE GENERATED SNAPSHOT IN 214 TO A SNAPSHOT LINKED-LIST 216

RESTORE INFORMATION IN THE SNAPSHOT BASED ON THE SECURITY BOUNDARY IN 214 218

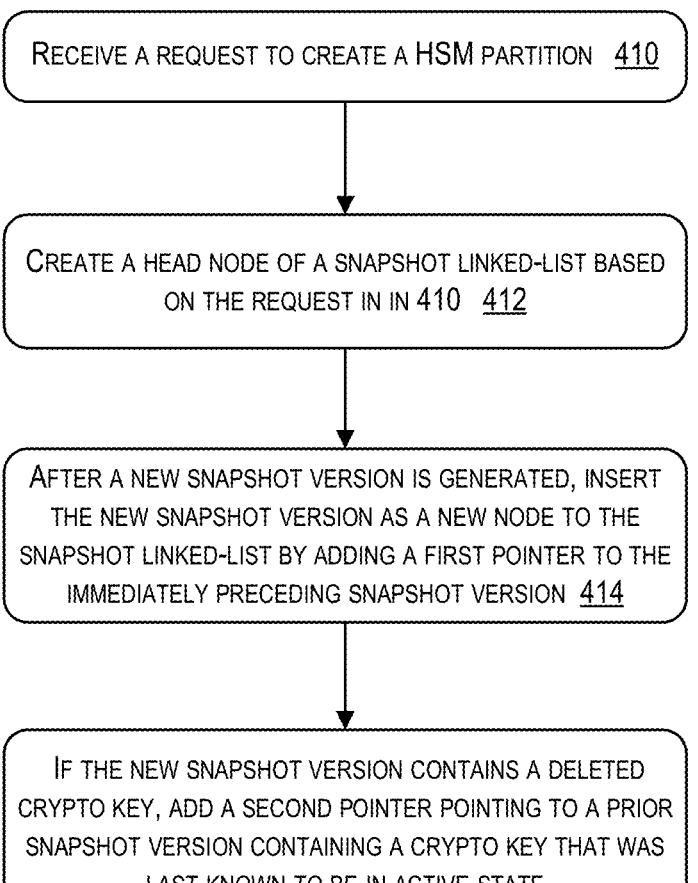

RECEIVE A REQUEST TO CREATE A HSM PARTITION    410

CREATE A HEAD NODE OF A SNAPSHOT LINKED-LIST BASED ON THE REQUEST IN IN 410    412

AFTER A NEW SNAPSHOT VERSION IS GENERATED, INSERT THE NEW SNAPSHOT VERSION AS A NEW NODE TO THE SNAPSHOT LINKED-LIST BY ADDING A FIRST POINTER TO THE IMMEDIATELY PRECEDING SNAPSHOT VERSION    414

IF THE NEW SNAPSHOT VERSION CONTAINS A DELETED CRYPTO KEY, ADD A SECOND POINTER POINTING TO A PRIOR SNAPSHOT VERSION CONTAINING A CRYPTO KEY THAT WAS LAST KNOWN TO BE IN ACTIVE STATE
416

*FIG. 4*

TECHNIQUES FOR CREATING SNAPSHOTS AND PERFORMING RECOVERY OF A HARDWARE SECURITY MODULE

CROSS-REFERENCES TO RELATED APPLICATIONS

This application is a non-provisional of and claims the benefit and priority under 35 U.S.C. 119(e) of U.S. Provisional Application No. 63/551,794, filed on Feb. 9, 2024, U.S. Provisional Application No. 63/553,460, filed on Feb. 14, 2024, and U.S. Provisional Application No. 63/653,068, filed on May 29, 2024, which are incorporated herein by reference in its entirety for all purposes.

FIELD

The present disclosure generally relates to key management services. More specifically, but not by way of limitation, techniques are described for creating snapshots and performing recovery of a hardware security module (HSM) using write-ahead logs (WALs) in a cloud infrastructure.

BACKGROUND

Cryptographic keys (referred to as crypto keys) stored in hardware security modules (HSMs) have become increasingly important for business operations to secure sensitive data, applications, and communication. Snapshot recovery of HSMs can help ensure business continuity in the event of unexpected natural disasters, hardware failures, or cyberattacks.

BRIEF SUMMARY

The present disclosure generally relates to key management services. More specifically, but not by way of limitation, techniques are described for creating snapshots and performing recovery of a hardware security module (HSM) using write-ahead logs (WALs) in a cloud infrastructure.

Various embodiments are described herein, including methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

BRIEF DESCRIPTION OF THE DRAWINGS

FIG. 2 is an example flowchart illustrating a generalized method for creating a multi-version snapshot linked list for a hardware security module (HSM), according to certain embodiments.

FIG. 4 is an example flowchart illustrating a process for creating a multi-version snapshot linked list, according to certain embodiments.

DETAILED DESCRIPTION

Figure 1:
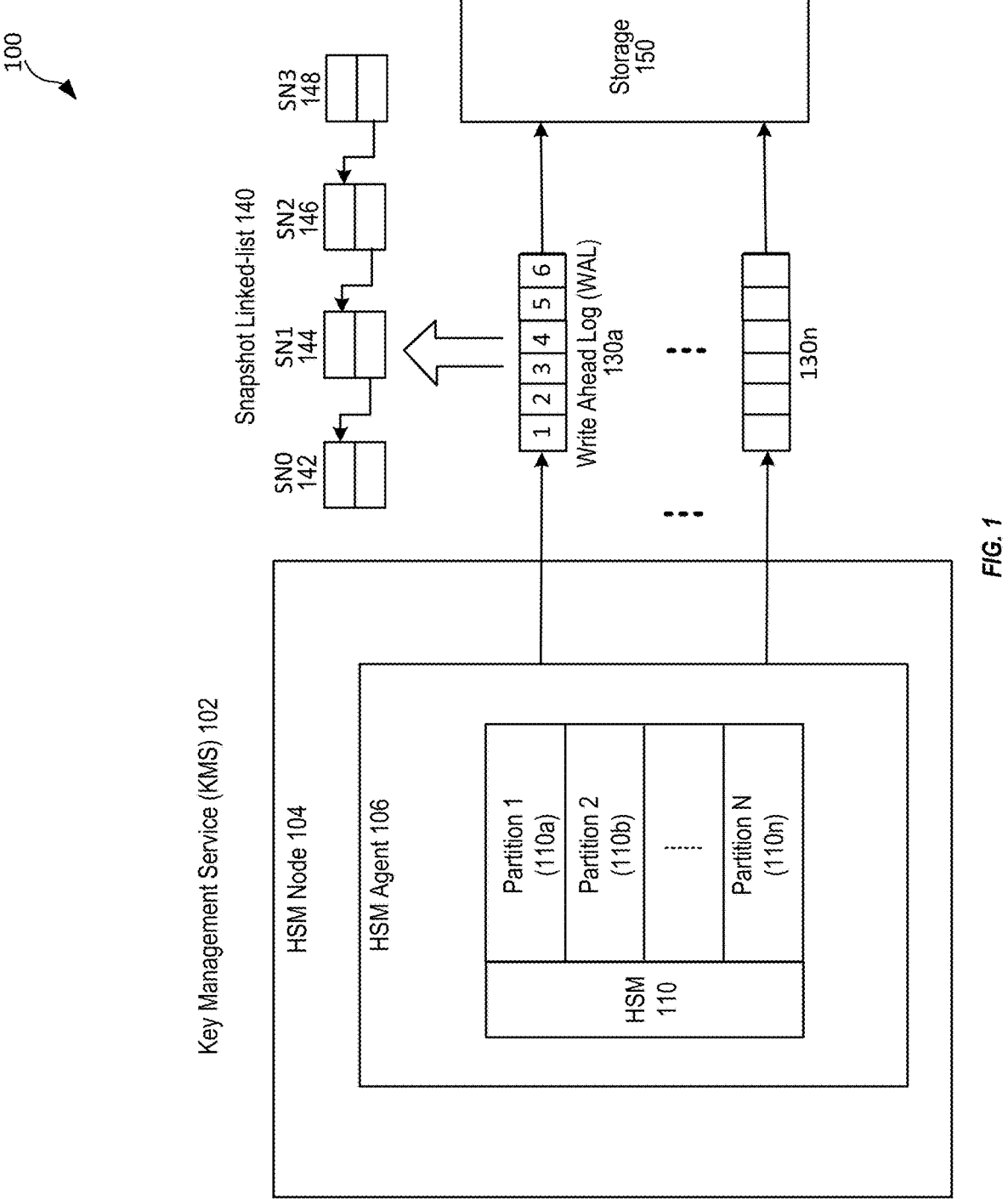
FIG. 1 is a block diagram of a distributed environment illustrating an example architecture of creating a multi-version snapshot linked list for a hardware security module (HSM) using a write-ahead log (WAL), according to certain embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Customers of a cloud service provider (CSP) may key management services (KMS) to manage and use crypto keys to integrate with other CSP-managed services like databases, object storage, etc. KMS may have hardware security module (HSM) nodes for storing customer's hardware cryptographic keys. An HSM can be a hardware device (e.g., HSM card, also referred to as HSM device) connected to a server of a CSP data center. Each HSM node may contain partitions isolated from one another. An HSM partition may include isolated storage and compute, and is dedicated to a single customer (or tenant).

The content of an HSM partition may be exported directly as a snapshot. During such a process, all control plane operations may need to be locked until the snapshot is taken on both the metadata and HSM partition contents. For a large HSM partition (e.g., 60K keys), this snapshot exporting process may cause significant downtime (e.g., several minutes). If a snapshot is not successful and needs retries, the downtime is further aggravated. Additionally, the exported snapshots may not be coherent on the storage storing snapshots because individual compute nodes can make changes to the storage. Thus, there is a need to address these challenges and others.

Techniques disclosed in the present disclosure can create and restore one or more portable snapshot files for recovery purposes based at least in part on the content of a HSM partition. The one or more snapshot files may include multiple snapshot versions formed as a linked list (referred to as a multi-version snapshot linked list), where each snapshot version can be saved as a file. The different versions (or the snapshot files) are structured as a linked list. Thus, a multi-version snapshot linked list may also be referred to as snapshot files. Any changes (e.g., mutation operation performed on a crypto key) in the HSM partition may result in state changes. Mutation operations may refer to operations that involve writing or updating a key, such as creating a key, deleting a key, changing a key, rotating a key, modifying a tag associated with the key, modifying a display name of the vault, etc. These changes are stored in a write-ahead log (WAL) as a temporary storage corresponding to the partition. When a state change resulting in a terminal state is stored in the WAL, a snapshot is taken from the WAL accordingly instead of directly from the HSM. Thus, the snapshot creation process and the modifications to content in the HSM can be performed in parallel. No locking is required between these two operations (or processes). Additionally, WAL may be compressed by removing intermediate entries and keeping the final state entry containing the terminal state. Finally, each object (e.g., a crypto key material) in the HSM partition can be traced back to all mutations that happened with that object across different snapshot versions.

In some embodiments, a snapshot version (i.e., an actual snapshot) of the multi-version snapshot linked list may incorporate the content of prior snapshot versions in the linked list such that a consumer (e.g., a customer of CSP (e.g., Oracle cloud infrastructure (OCI)) or an internal service of the CSP) restoring the current snapshot version can have a full picture of the historical data for mutation up to the current snapshot version. In other words, each snapshot version may be a full snapshot (e.g., metadata, partition, and key materials), not deltas, of an HSM partition at a point in time.

In some embodiments, a particular snapshot version (i.e., a linked-list node), containing a crypto key in non-active state (e.g., DELETED state), of the multi-version snapshot linked list may have more than one pointer (e.g., two pointers), a first pointer pointing to the immediately preceding snapshot version and a second pointer pointing to a prior snapshot version containing the same crypto key that was last known to be in active state (e.g., CREATED state).

In some embodiments, each snapshot version may be indexed (i.e., contain indices for its objects) such that an object (e.g., a crypto key) in a snapshot version can be identified through the indices, and restored. In other words, a particular crypto key can be restored from a snapshot version without restoring the whole snapshot that may include other objects.

In certain embodiments, a snapshot created based on a HSM partition is associated with a security boundary comprising a unique key for encrypting the crypto key in that snapshot and a specific geographic partition (e.g., a particular shard in a region in a realm). The snapshot files containing multiple versions of snapshots are immutable and read-only, and can only be restored by following the security boundary.

In some embodiments, integrity checks (e.g., checksum validations) may be performed for each snapshot of a snapshot linked list to ensure crypto key materials are not corrupted during the snapshot creation process before promoting the snapshot linked list to a remote repository.

In some embodiments, an anti-entropy check through the Merkle tree may also be performed on when snapshots are taken across disparate compute nodes (e.g., for replication).

In further embodiments, a restoration validation may also be performed to validate the restoration of a snapshot in the snapshot linked list by checking a constant string encrypted and embedded in the payload of an exported crypto key.

Embodiments of the present disclosure provide a number of advantages/benefits. For example, a multi-version snapshot linked list may have the whole HSM history (e.g., all the historical data for mutations) that is encapsulated in portable files, and can be stored anywhere. This provides flexibility for storing and can reduce costs for a customer by not having to store crypto key materials in an HSM all the time.

Additionally, the security boundary of the snapshot linked list is still preserved when the snapshot linked list is exported in an encrypted format. In other words, if a consumer (e.g., a customer of cloud service provider (CSP) or an internal service of the CSP) wants to restore crypto key materials from a snapshot version into an HSM, the snapshot can only be put back to the same realm, region, and shard (e.g., a group of homogeneous compute nodes or compute instances) using the same unique key (e.g., masking key) that was used to encrypt the crypto key materials. Thus, anyone who obtains the portable snapshot linked list without proper credentials is not able to read nor tamper with the file.

Finally, the snapshot linked list provides a consumer with complete historical information on mutations, for example, when a crypto key was created or deleted, so the consumer can choose a particular snapshot version to restore. Such snapshot linked list acts as a time machine, allowing the consumer to go back in time to restore needed crypto key information.

Architecture of Creating a Snapshot Linked List for a Hardware Security Module (HSM)

In the context of the cloud, a realm refers to a logical collection of one or more regions. Realms are typically isolated from each other and do not share data. Within a region, the data centers in the region may be organized into one or more availability domains (ADs). Availability domains are isolated from each other, fault-tolerant, and very unlikely to fail simultaneously. ADs are configured such that a failure at one AD within a region is unlikely to impact the availability of the other ADs within the same region. KMS may be physically split into shards in a region. A shard may comprise a group of homogeneous compute nodes or compute instances. A set of compute nodes in a shard may act as a single HSM device. HSM mutations may be replicated across all compute nodes in a shard. A snapshot partition may be within a compute node that includes one or more servers.

FIG. 1 is a block diagram of a distributed environment illustrating an example architecture of creating a multi-version snapshot linked list for a hardware security module (HSM) using write-ahead log (WAL), according to certain embodiments. Distributed environment 100 depicted in FIG. 1 is merely an example and is not intended to unduly limit the scope of claimed embodiments. Many variations, alternatives, and modifications are possible. For example, in some implementations, distributed environment 100 may have more or fewer systems or components than those shown in FIG. 1, may combine two or more systems, or may have a different configuration or arrangement of systems. The systems, subsystems, and other components depicted in FIG. 1 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

As shown in FIG. 1, key management services (KMS) 102 may include an HSM node 104, which may comprise specialized hardware devices that perform secure cryptographic operations, store, and protect cryptographic keys. The HSM node may further include one or more HSM agents, where each HSM agent (e.g., 106) is a microservice built on top of an HSM 110 for performing management operations (e.g., partition management, key management, backup and restore, etc.) and crypto operations (e.g., encrypt, decrypt, verify, etc.) for the HSM. HSM 110 may be a hardware device for storing hardware crypto keys and connected to a server of a CSP data center. KMS may use an HSMs to store master/key encryption keys that adhere to the federal information processing standards (FIPS) 140-2 Level 3 specification, which provides tamper-resistant and tamper-evident capabilities. In FIG. 1, the HSM 110 may have several partitions (e.g., 110a to 110n), where each partition may have compute resources (e.g., CPUs and storage), and is dedicated to a single tenant.

In FIG. 1, in some embodiments, a write-ahead log (WAL) (e.g., 130a), as a temporary storage, local to the HSM 110 may be used to temporarily store changes to a particular HSM partition (e.g., HSM partition 1 110a), for example, creating (referred to as first-type operation), deleting (referred to as second-type operation), or other operations performed on a crypto key, before sending these changes to the permanent storage (or remote repository) 150, such as key-value block storage. One WAL may be used or dedicated to one HSM partition. For example, other WALs (130b to 130n) may be associated with other HSM partitions (e.g., 110b to 110n). In other embodiments, a WAL may be shared by multiple HSM partitions, for example, a WAL for HSM partitions 1 and 2, and another WAL for HSM partitions 3 to N.

In some embodiments, any operations (e.g., mutation) performed on a crypto key in the HSM partition may be stored in a log entry of the WAL 130. Entries of WAL may be ordered using sequence number which is called log sequence number (LSN). LSN may act as a logical clock. For example, a crypto key A is created in the HSM partition, then the corresponding state CREATED is stored in a first WAL entry associated with a log sequence number 1 (LSN 1). A crypto key B is created in the HSM partition, then the corresponding state CREATED is stored in a second WAL entry associated with a log sequence number 2 (LSN 2). The crypto key A is modified in the HSM partition, then the corresponding state MODIFIED is stored in a third WAL entry associated with a log sequence number 3 (LSN 3). Finally, the crypto key A is deleted in the HSM partition, then the corresponding state DELETED is stored in a fourth WAL entry associated with a log sequence number 4 (LSN 4).

Returning to FIG. 1, a multi-version snapshot linked-list 140 may be created based on content stored in the log entries (referred to as entries) of the WAL 130. In some embodiments, a snapshot daemon may keep track of the WAL entries. When the daemon that filters the WAL detects that at least one unprocessed entry is in the terminal state (e.g., CREATED and DELETED), it may collect all unprocessed entries until the next terminal state. A terminal state may refer to a state in which a crypto key becomes available (or active) or unavailable (or non-active), such as creation and deletion. The snapshot daemon may then request a snapshot repository manager to create a new snapshot version.

For example, a snapshot version 0 (SN0) 142 is created as a head node of linked list 140 when an HSM partition (e.g., 110a) is allocated. When the crypto key A is created, resulting in a terminal state (CREATED state), a snapshot version 1 (SN1) 144 is created. When crypto key B is created, resulting in a terminal state (CREATED), a snapshot version 2 (SN2) 146 is created. However, when crypto key A is modified, resulting in a transient state, no snapshot is created. When crypto key A is deleted, resulting in a terminal state (DELETED), a snapshot version 3 (SN3) 148 is created.

As a result, operations performed on crypto keys in an HSM partition can occur in parallel as snapshots are taken from the WAL entries. The techniques avoid the need for a locking mechanism between these two concurrent processes (i.e., performing operations on a crypto key and taking a snapshot of a WAL). Together, these two processes may be equivalent to taking a snapshot of the modified content of an HSM partition. In certain embodiments, a change to (or an operation performed on) a crypto key may add more than one entry to the WAL; the WAL may be compacted by removing all intermediate entries to keep only the final state entry before taking a snapshot. For example, an operation to a crypto key (e.g., creating) may add multiple entries to the WAL because an object creation process may go through multiple states before it is created. As an example, those intermediate states may add multiple entries to the WAL, such as one entry for the CREATING state, another entry for the REPLICATING state, yet another entry for the CREATED state, etc. When taking a snapshot of the WAL, the entries for the intermediate states (e.g., CREATING and REPLICATING) may be removed, leaving only the entry with the final state, CREATED state.

In certain embodiments, a snapshot created based on an HSM partition is associated with a multi-level security boundary. As a result, a snapshot version in the multi-version snapshot linked list can only be restored to the same multi-level security boundary. A multi-level security boundary refers to multi-level security protecting a crypto key in the HSM partition, such as a realm, a region, a shard, and a masking key. For example, for first-level security, when a new partition in an HSM is created, a unique masking key for that partition is automatically created. The masking key may be used to encrypt the crypto key when it is exported out of the HSM partition to the WAL. When a snapshot containing the crypto key is restored later, the restoration may require the same masking key. In other words, the crypto key can only be restored to the same HSM partition. A snapshot restoration/recovery may refer to parsing a multi-version snapshot linked-list file and recovering the HSM metadata and contents.

Additionally, for second-level security, an HSM card, a hardware device including a PCIE, CPUs, and storage may have many HSM partitions in a region. Each HSM partition, belonging to a tenant (e.g., a consumer) and containing a number of CPUs and a portion of storage, is isolated from another HSM partition in the region. Therefore, any crypto key information exported out of a particular HSM partition can only be restored to the same HSM partition.

Finally, for third-level security, a manufacturer, or an owner of an HSM card may install a root key with a certificate to show the ownership. The root key is at the realm level. As a result, any information created and later exported out of the HSM card can only be restored to the same HSM card using the same root key and certificate. In other words, there are at least three levels of security boundary for the snapshot creation and restoration-realm level using root key and certificate, region, and shard level for HSM partition, and masking key for each individual crypto key.

FIG. 2 is an example flowchart illustrating a generalized method for creating a multi-version snapshot linked list for a hardware security module (HSM), according to certain embodiments. The processing depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 2 may include a greater number or a lesser number of steps than those depicted in FIG. 2.

At step 210, an operation may be performed on a crypto key in an HSM partition. As discussed above, a crypto key in an HSM partition may be created, modified, or deleted, resulting in changes to the object state for the crypto key materials. A state, such as CREATED or DELETED, may be referred to as a terminal state. A state, such as MODIFIED (e.g., for updating a key name) or REPLICATING (e.g., for replicating a key) may be referred to as a transient state.

At step 212, crypto key state information resulting from the operation in 210 is stored in an entry of a temporary storage (e.g., WAL). Any changes to (or operations performed on) a crypto key in an HSM partition may be temporarily stored in a local WAL 130. For example, as discussed above in relation to FIG. 1, an operation (e.g., creation, modification, or deletion) performed to a crypto key in an HSM partition (e.g., 110*a*) may add one or more entries, including an entry containing the crypto key state information to WAL 130 in FIG. 1. However, the WAL may be compacted to leave only the entry that contains the final state (i.e., crypto key state information) for snapshot creation.

At step 214, a snapshot of the entry of the temporary storage may be created based on a security boundary. For example, as discussed above, a three-level security boundary, including a masking key, an isolated partition at a region and shard level, and a realm-level root key and certificate, is associated with the created snapshot.

At step 216, the generated snapshot in 214 may be added to a multi-version snapshot linked list. For example, in FIG. 1, snapshot version 1 144 created from an entry (e.g., entry 1) of WAL 130 may be added as the second linked-list node to the snapshot linked list 140. Snapshot version 2 146 created from an entry (e.g., entry 2) of WAL 130 may be added as the third linked-list node to the snapshot linked list 140, and so on.

At step 218, information in the snapshot may be restored based on the security boundary in 214. In other words, the content of a HSM partition may be recovered by restoring the snapshot to the particular HSM partition. For example, as discussed above, a customer who likes to restore a particular snapshot version (e.g., version 1 144) or multiple snapshot versions (e.g., versions 1 and 2) can only restore the content in the snapshot(s) back to a particular HSM partition for a specific shard in a region in a realm, and while using the same masking key and root key as described above. In other words, the snapshot linked list allows one to recreate a resource (e.g., vault, key, key version) with full fidelity. Thus, even if the snapshot linked list is portable, anyone who obtains the snapshot linked list is not able to tamper with the snapshot linked list (i.e., snapshot files).

Figure 3:
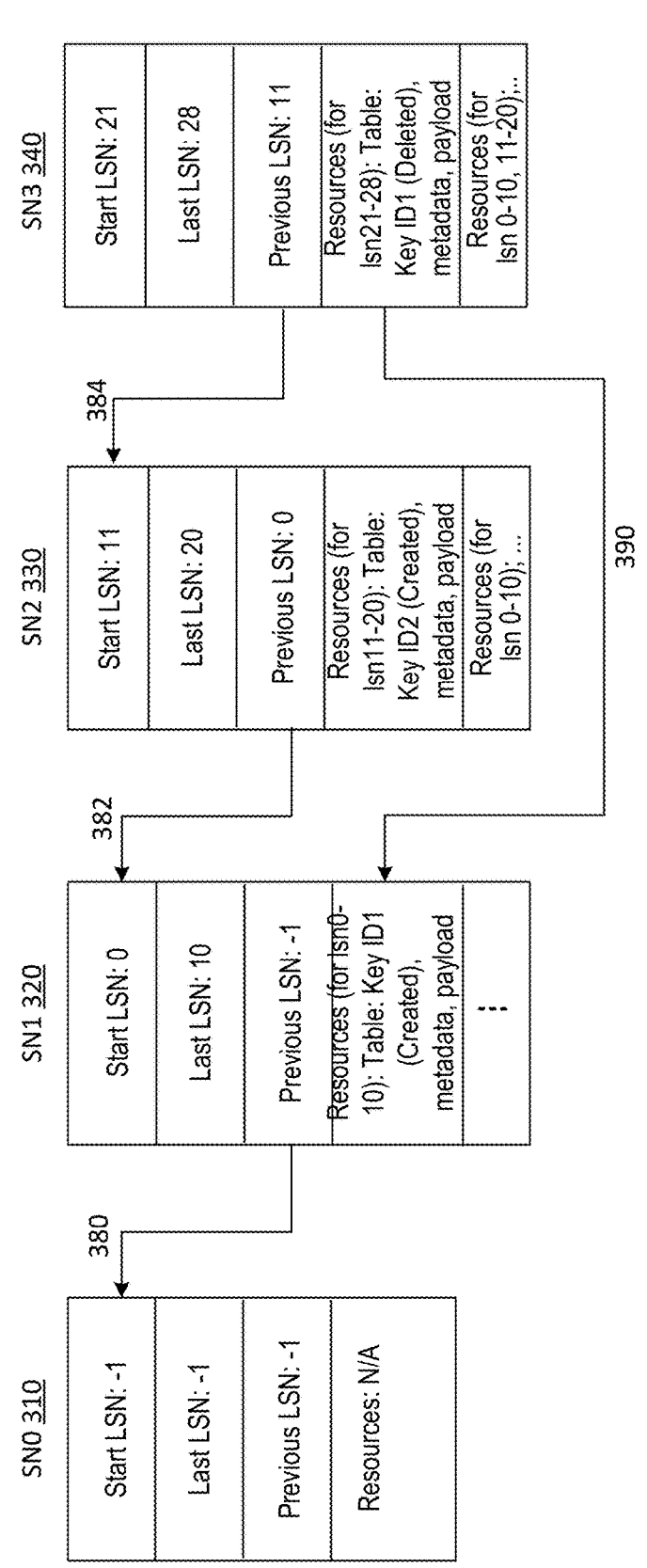
FIG. 3 is a diagram illustrating a multi-version snapshot linked list created based on the content of an HSM, according to certain embodiments.

FIG. 3 is a diagram illustrating a multi-version snapshot linked list created based on the content of an HSM, according to certain embodiments. In FIG. 3, a linked-list structure 300 may include four linked-list nodes (referred to as nodes) 310, 320, 330, and 340. Each linked-list node represents a snapshot version corresponding to a snapshot created based on a WAL entry (or one or more WAL entries if compaction is used) for a crypto key reaching its terminal state. The particular crypto key is called the primary key for that snapshot (i.e., snapshot version). Each linked-list node (i.e., snapshot version) may have several fields, including but not limited to a start_LSN, a last_LSN, a previous_LSN, and resources, including metadata covering the start_LSN to the last_LSN and a key table. The start_LSN and last_LSN may be the WAL entries used as the basis for a snapshot creation. As discussed above, in some embodiments, WAL entries may be compacted when creating a snapshot. As a result, the start_LSN and last_LSN corresponding to these WAL entries are tracked, but only the crypto key information in a WAL entry (e.g., corresponding to last_LSN) containing a terminal state (e.g., CREATED and DELETED) may be captured in the new snapshot.

For example, in FIG. 3, the first snapshot version 310 (i.e., the left-most linked-list node/object) is an empty snapshot (referred to as snapshot version 0 or SN0) when an HSM partition is created for a consumer. The start_LSN, last-_LSN, and previous_LSN are all assigned with value −1, not corresponding to any log sequence number. This empty snapshot does not contain any resource information.

When a crypto key with ID1 is created in an HSM partition, the crypto key may be replicated across all servers in a compute node containing the HSM partition until the crypto key state becomes CREATED state. Then, the crypto key state is stored in an entry of WAL (e.g., 130 in FIG. 1). The snapshot daemon may detect that a WAL entry contains a terminal state (CREATED) for crypto key ID1. As a result, a new snapshot (referred to as snapshot version 1 or SN1) 320 is created with a pointer 380 pointing to SN0 310 because the CREATED state is a terminal state. The crypto key with ID1 may be designated as the primary key for SN1. The pointer may be a reference in the previous_LSN field (or called pointer field), for example, storing the start_LSN value of the immediately preceding snapshot version (i.e., SN0), which is −1. The pointer pointing to an immediately preceding snapshot version in the linked list may be referred to as a first-type pointer.

The resources field of SN1 (i.e., the second linked-list node/object in FIG. 3) may include, but is not limited to, various metadata, key table for crypto key ID1 that includes the crypto key state (e.g., CREATED), log entry payload for the key, and checksum. In some embodiments, SN1 may be created involving ten WAL entries corresponding to LSN 0 to LSN 10, with the WAL entry for LSN 10 containing the terminal state (e.g., CREATED). WAL entries corresponding to LSN 0 to LSN 9 may be compressed/removed and keep only essential information in SN1. In some embodiments, the LSN may be used to track the time for each snapshot version. Other alternatives, such as epoch time, may also be used.

Continuing with FIG. 3, when a crypto key with ID2 is created in the HSM partition, a similar snapshot creation process to SN1 is performed for snapshot version 2 (or SN2) 330. SN2 may contain crypto key information for WAL entries corresponding to start_LSN 11 to last_LSN 20. The previous_LSN field of SN2 may have a reference value of LSN 0 as a pointer 382 pointing to the start_LSN field of SN1 320. The resources field of SN2 may also include various metadata, key table for crypto key ID2 that includes the crypto key state (e.g., CREATED), log entry payload for the key, and checksum.

In certain embodiments, after a new snapshot version (e.g., SN2 330) is added to a snapshot linked list (e.g., 300), the immediately preceding snapshot entry (e.g., SN1 320) may be streamed into and become part of this newly created snapshot version such that the latest snapshot version (e.g., SN2 330 in this example) can represent a full snapshot of the HSM partition, not just the delta (i.e., crypto key ID2 only). In other words, SN2 330 may contain not only resources for LSN 11 to LSN 20 (i.e., information for primary crypto key ID2), but also LSN 0 to LSN 10 (i.e., information for crypto key ID1). Any duplicate information, such as entries in SN1 (i.e., the immediately preceding snapshot version) that already exist in SN2 (based on its primary crypto key), may be discarded. Thus, a consumer restoring SN2 can have the full picture of the historical data for mutations up to SN2.

Continuing with FIG. 3, assuming crypto key ID1 is deleted in the HSM partition, where the deletion process involves eight WAL entries corresponding to LSN 21 to LSN 28, the snapshot daemon may detect that WAL entry for LSN 28 contains a terminal state (DELETED) for crypto key ID1. As a result, another snapshot SN3 (referred to as snapshot version 3) 340 is created with a pointer 384 pointing to SN2 330 (i.e., pointing from previous_LSN field of SN3 to start_LSN field of SN2). Similarly, the resources field of SN3 may include, but not limited to, various metadata, key table for crypto key ID1 that includes the crypto key state (e.g., DELETED), log entry payload for the key, and checksum. As discussed above, SN3 may contain additional resource information from SN2, which includes LSN 0 to LSN 10 (i.e., information for crypto key ID1) and LSN 11 to LSN 20 (i.e., information for crypto key ID2). Because a snapshot version (e.g., SN3) can store only the latest crypto key states for efficiency, SN3 may have information for crypto key ID2 in CREATED state and crypto key ID1 in DELETED state.

In some embodiments, if a snapshot version contains a terminal state DELETED for a primary crypto key, an additional pointer (e.g., a second pointer) may be added to point to a prior snapshot version containing the primary crypto key with the active state (e.g., CREATED). For example, the terminal state of primary crypto key ID1 in SN3 340 is "DELETED," thus its resources field of SN3 for the primary crypto key ID1 may add a second pointer 390 pointing to SN1 320. This second pointer 390 (also referred to as a second-type pointer) can help trace a particular crypto key that is in an inactive state (e.g., DELETED) to a prior snapshot version with that particular crypto key in an active state (e.g., CREATED). Although SN3 has the information of SN2 (e.g., resources for LSN 11-20) and SN1 (resources for LSN 0-10), this second pointer 390 allows a consumer interested in identifying or restoring only the information for crypto key ID1 in active state.

As discussed above, because each snapshot version may be indexed, a consumer who likes to restore a particular crypto key can query the crypto key by looking up the indices of the latest snapshot version to quickly identify the information related to the particular crypto key for restoration, instead of restoring the entire snapshot containing other crypto keys. If the queried key is in an active state, the consumer can obtain the requested information directly from the latest snapshot version. If the queried key is in an inactive state, the consumer may traverse the snapshot linked list to locate the requested information. Such an indexing mechanism (called multiversion-indexed file) for each snapshot file in a multi-version linked list can help key restoration in situations, for example, where an HSM is missing a key or a key is actually corrupted.

As an example, SN3, which is the latest snapshot version, may include information for both crypto keys ID1 and ID2. If a consumer like to restore crypto key ID2, the consumer can look up the indices for SN 3 to find information for crypto key ID2 (in CREATED state) to restore. However, if the consumer likes to restore crypto key ID1, it may look up the indices for SN3 and find that crypto key ID1 is in a DELETED state. As a result, the pointer 390 may allow the consumer to traverse the linked list to find SN1 that contains crypto key ID1 in active (i.e., CREATED) state, look up indices for SN1 to find information for crypto key ID1 for restoration.

In certain embodiments, the additional pointer (e.g., the second-type pointer) for a snapshot version (or snapshot entry) may be used whenever a mutation (e.g., resulting in a terminal state) to a particular primary key occurs in that snapshot version. Considering a situation, for example, crypto key ID1 is created (i.e., in CREATED state) in SN1 320. Crypto key ID1 is deleted (i.e., in DELETED state) in SN3 340. Crypto key ID1 is created again (i.e., in CREATED state) in SN 6 (not shown). Crypto key ID1 is deleted again (i.e., in DELETED state) in SN10 (not shown). Accordingly, SN10 may have a second pointer (i.e., the second-type pointer) pointing to SN6. SN3 also has a second pointer pointing to SN1, as shown in FIG. 3. As a result, crypto key ID1's mutation history can be traced using the second-type pointer.

FIG. 4 is an example flowchart illustrating a process for creating a multi-version snapshot linked list, according to certain embodiments. The processing depicted in FIG. 4 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIG. 4 may include a greater number or a lesser number of steps than those depicted in FIG. 4.

At step 410, a request to create an HSM partition is received. A customer of a CSP (e.g., Oracle cloud infrastructure (OCI)) likes to have a dedicated KMS to have ownership of crypto keys; a single-tenant HSM partition may be created for storing these crypto keys.

At step 412, a head node of a snapshot linked list is created based on the request in in 410. For example, in FIG. 3, snapshot version 0 (SN0) 310 may be created when a HSM partition is created and allocated. The head node (i.e., SN0) may be empty snapshot that does not contain any resources information.

At step 414, after a new snapshot version is generated, the new snapshot version is inserted as a new linked-list node to the snapshot linked-list by adding a first pointer to the immediately preceding snapshot version. For example, in FIG. 3, when snapshot version 1 (SN1) 320 is created (i.e., a first-type operation) and inserted as a linked-list node to the multi-version snapshot linked list 300, a first pointer 380 (i.e., the first-type pointer) is added to point to SN0. Similarly, snapshot version 2 (SN2) 330 also has a first pointer 382 pointing to SN1. Snapshot version 3 (SN3) 340 has a first pointer 384 pointing to SN2.

At step 416, if the new snapshot version contains a crypto key in non-active state (e.g., DELETED), add a second pointer pointing to a prior snapshot version containing the crypto key that was last known to be in active state (e.g., CREATED). For example, in FIG. 3, snapshot version 3 (SN3) 340 contains crypto key ID1 in non-active state (e.g., DELETED due to a second-type operation, deletion), a second pointer 390 (i.e., the second-type pointer) is added to point from SN3's resources field to resource object (or field) of SN1 320 identifying the crypto key ID1 in active state (e.g., CREATED).

As discussed above, when creating a multi-version snapshot linked list, integrity checks (e.g., snapshot checksum validations) may be performed at runtime for each snapshot before the snapshot linked list (or snapshot files) is provided to a consumer or put into a remote repository (e.g., permanent storage 150 of FIG. 1).

In some embodiments, a checksum value is provided by the HSM device during key export to log entries of WAL. The checksum value may also be stored in the log entry payload of a snapshot when the snapshot is created. A daemon may run locally, validating the newly created snapshot to ensure the checksum in the snapshot matches the checksum of the log entry used for creating the snapshot. Thus, the integrity check can validate that the key material is not corrupted during the snapshot creation process.

Additionally, an integrity check for data corruption (e.g., bit flips) may be performed when a snapshot is being taken across disparate compute nodes (e.g., during replication), which may also be referred to as an anti-entropy check through the Merkle tree. In some embodiments, each snapshot file (or snapshot version) may have a Merkle tree built which represents the hashes of the log entries of WAL for given resources (e.g., crypto keys).

The root hash of a Merkle tree may be calculated through an iterative process of hashing and combining node values (e.g., hashes of crypto keys), moving from the leaf nodes up to the root. Thus, the root hash may represent a cryptographic summary of all data in the tree (i.e., a snapshot). When there is a Merkle root mismatch (e.g., compared to a previous root hash), the KMS management plane will send a request to all servers of the compute nodes involved to validate and fix the problematic log entries against the WAL which in turn re-calculates the Merkle hashes, fixing any mismatch.

Finally, a restoration validation may also be performed to validate the restoration of one or more snapshots of the snapshot linked list. In some embodiments, a constant string (e.g., a plaintext string "hello") up to 32 bytes may be provided by a customer and encrypted into the payload of a newly created crypto key before the key material is exported out of the HSM partition. When the customer wants to restore the key material back to the HSM partition, the previously encrypted constant string in the payload may be decrypted to ensure it matches the expected constant string. Example Cloud Service Provider Infrastructure (CSPI) Architectures As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
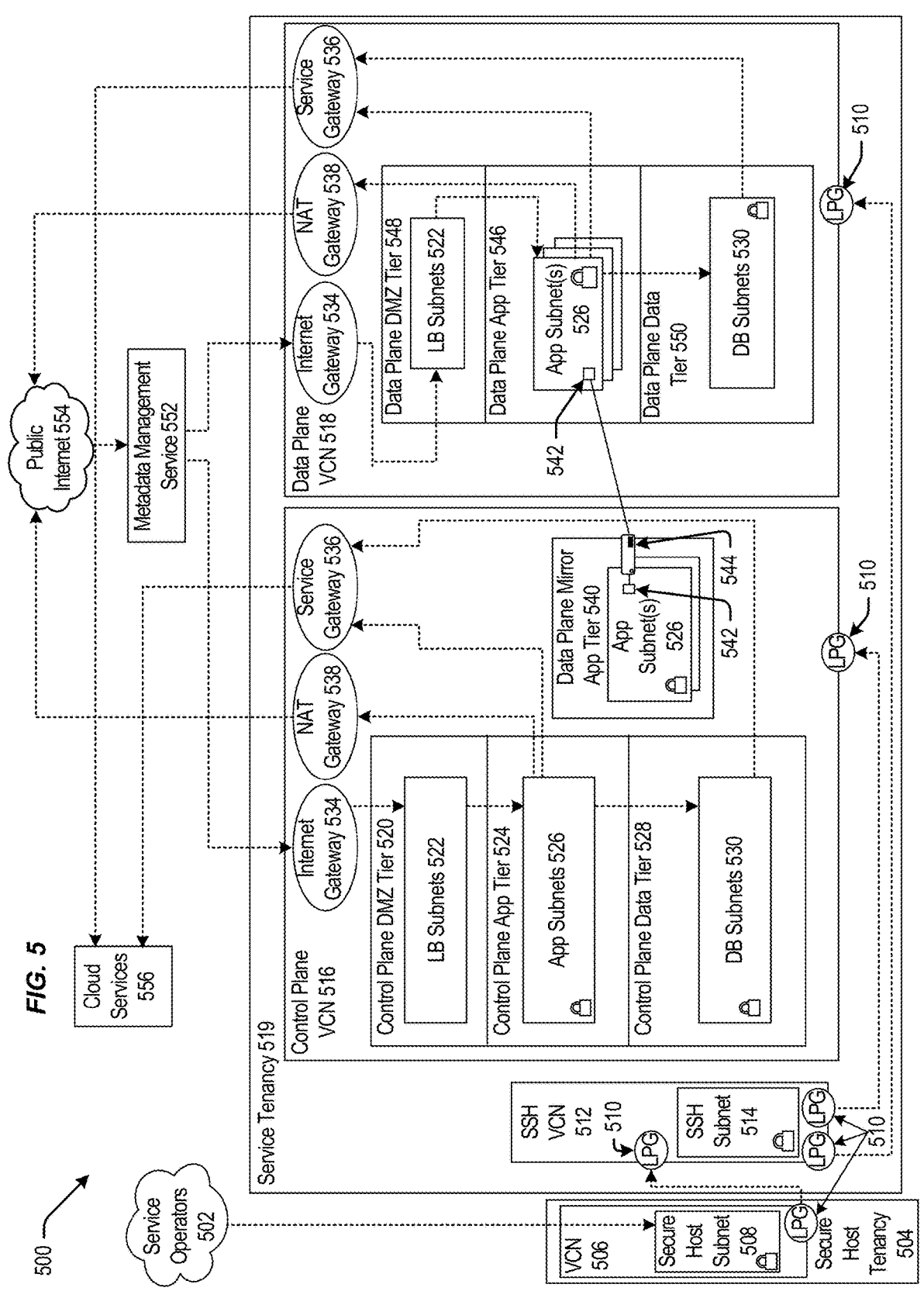
FIG. 5 is a block diagram illustrating one pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively coupled to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Metadata that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of threat prevention, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
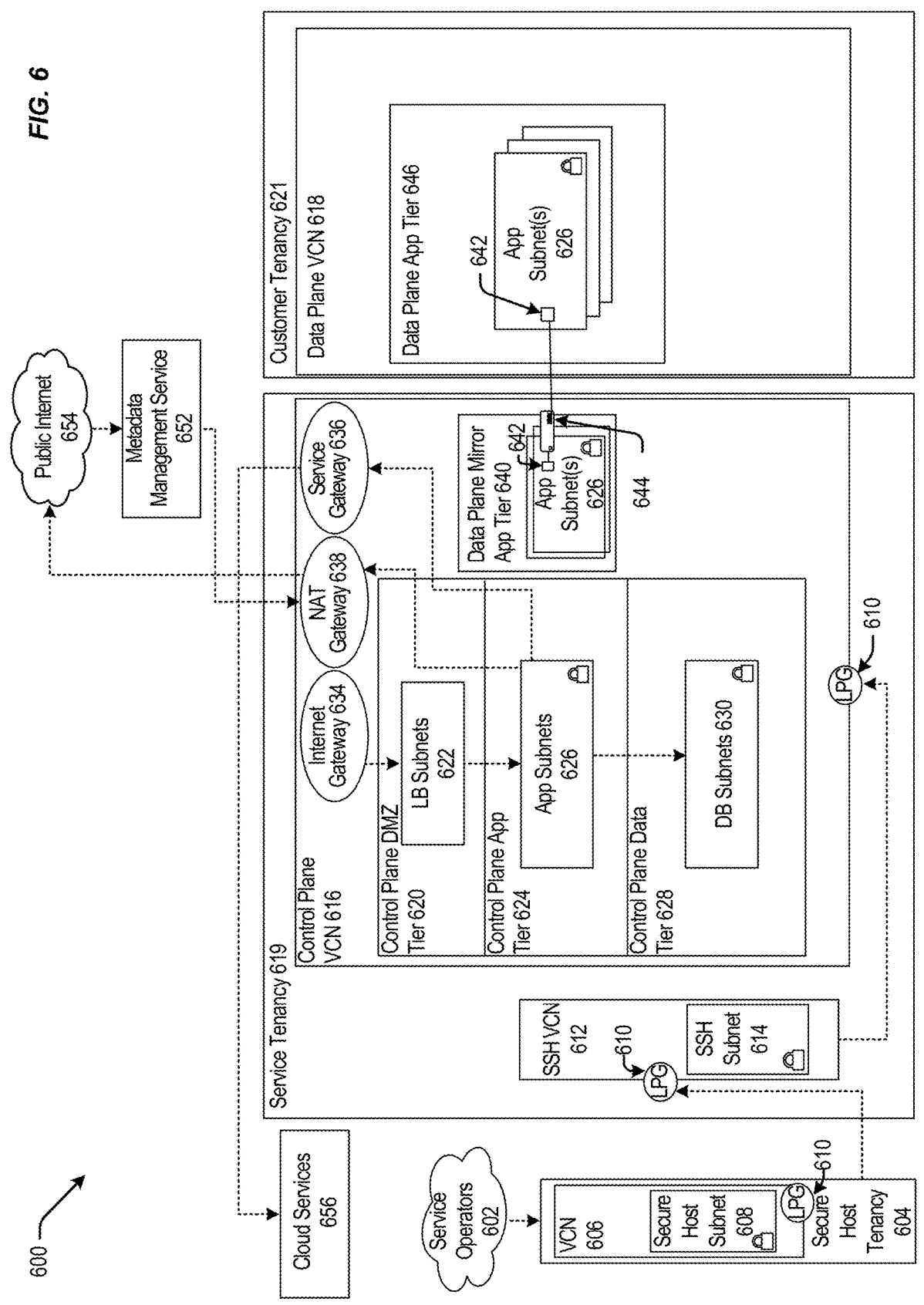
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g., service operators 502 of FIG. 5) can be communicatively coupled to a secure host tenancy 604 (e.g., the secure host tenancy 504 of FIG. 5) that can include a virtual cloud network (VCN) 606 (e.g., the VCN 506 of FIG. 5) and a secure host subnet 608 (e.g., the secure host subnet 508 of FIG. 5). The VCN 606 can include a local peering gateway (LPG) 610 (e.g., the LPG 510 of FIG. 5) that can be communicatively coupled to a secure shell (SSH) VCN 612 (e.g., the SSH VCN 512 of FIG. 5) via an LPG 510 contained in the SSH VCN 612. The SSH VCN 612 can include an SSH subnet 614 (e.g., the SSH subnet 514 of FIG. 5), and the SSH VCN 612 can be communicatively coupled to a control plane VCN 616 (e.g., the control plane VCN 516 of FIG. 5) via an LPG 610 contained in the control plane VCN 616. The control plane VCN 616 can be contained in a service tenancy 619 (e.g., the service tenancy 519 of FIG. 5), and the data plane VCN 618 (e.g., the data plane VCN 518 of FIG. 5) can be contained in a customer tenancy 621 that may be owned or operated by users, or customers, of the system.

The control plane VCN 616 can include a control plane DMZ tier 620 (e.g., the control plane DMZ tier 520 of FIG. 5) that can include LB subnet(s) 622 (e.g., LB subnet(s) 522 of FIG. 5), a control plane app tier 624 (e.g., the control plane app tier 524 of FIG. 5) that can include app subnet(s) 626 (e.g., app subnet(s) 526 of FIG. 5), a control plane data tier 628 (e.g., the control plane data tier 528 of FIG. 5) that can include database (DB) subnet(s) 630 (e.g., similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g., the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g., the service gateway 536 of FIG. 5) and a network address translation (NAT) gateway 638 (e.g., the NAT gateway 538 of FIG. 5). The control plane VCN 616 can include the service gateway 636 and the NAT gateway 638.

The control plane VCN 616 can include a data plane mirror app tier 640 (e.g., the data plane mirror app tier 540 of FIG. 5) that can include app subnet(s) 626. The app subnet(s) 626 contained in the data plane mirror app tier 640 can include a virtual network interface controller (VNIC) 642 (e.g., the VNIC of 542) that can execute a compute instance 644 (e.g., similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g., the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g., the metadata management service 552 of FIG. 5) that can be communicatively coupled to public Internet 654 (e.g., public Internet 554 of FIG. 5). Public Internet 654 can be communicatively coupled to the NAT gateway 638 contained in the control plane VCN 616. The service gateway 636 contained in the control plane VCN 616 can be communicatively coupled to cloud services 656 (e.g., cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
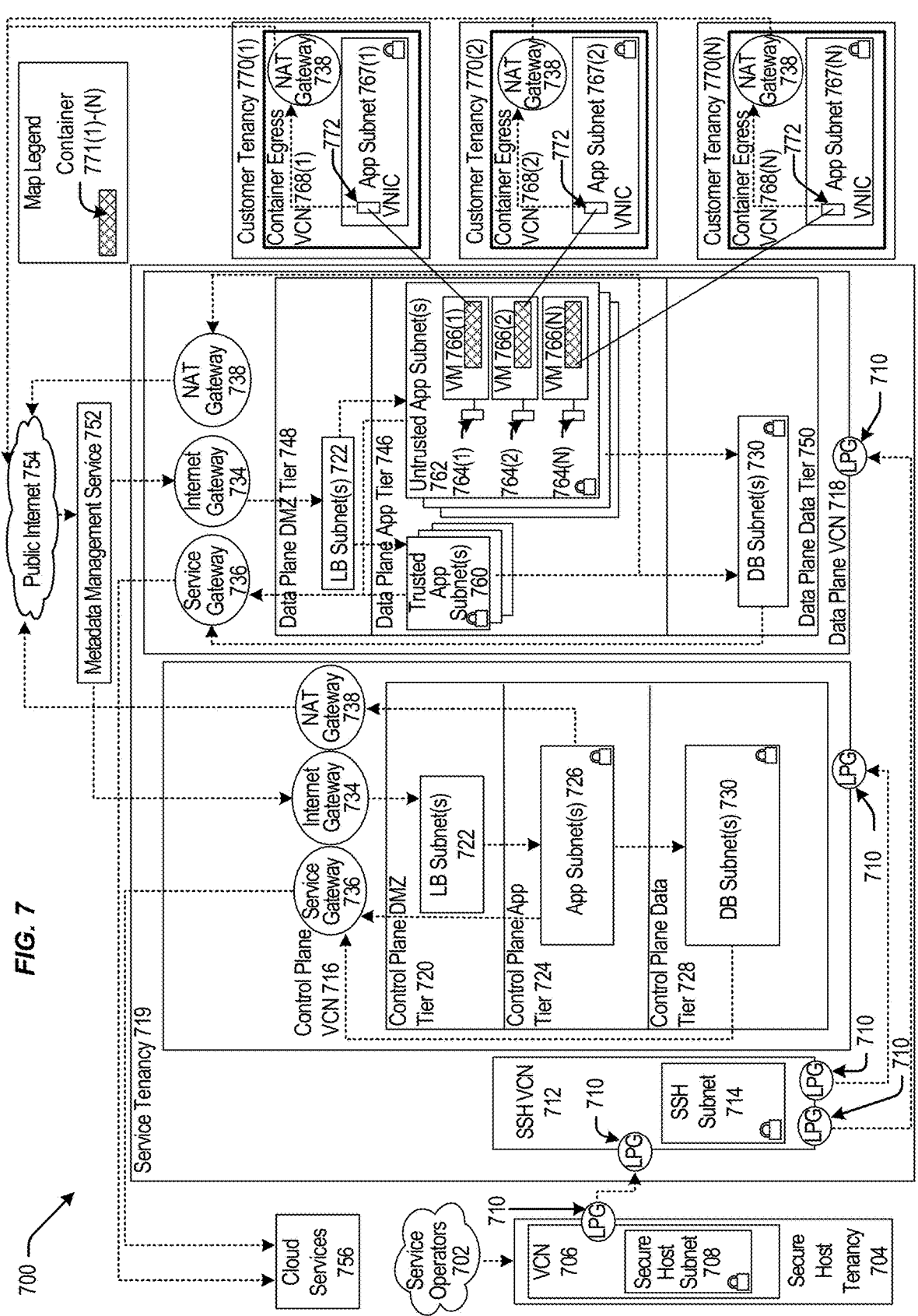
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 502 of FIG. 5) can be communicatively coupled to a secure host tenancy 704 (e.g., the secure host tenancy 504 of FIG. 5) that can include a virtual cloud network (VCN) 706 (e.g., the VCN 506 of FIG. 5) and a secure host subnet 708 (e.g., the secure host subnet 508 of FIG. 5). The VCN 706 can include an LPG 710 (e.g., the LPG 510 of FIG. 5) that can be communicatively coupled to an SSH VCN 712 (e.g., the SSH VCN 512 of FIG. 5) via an LPG 710 contained in the SSH VCN 712. The SSH VCN 712 can include an SSH subnet 714 (e.g., the SSH subnet 514 of FIG. 5), and the SSH VCN 712 can be communicatively coupled to a control plane VCN 716 (e.g., the control plane VCN 516 of FIG. 5) via an LPG 710 contained in the control plane VCN 716 and to a data plane VCN 718 (e.g., the data plane 518 of FIG. 5) via an LPG 710 contained in the data plane VCN 718. The control plane VCN 716 and the data plane VCN 718 can be contained in a service tenancy 719 (e.g., the service tenancy 519 of FIG. 5).

The control plane VCN 716 can include a control plane DMZ tier 720 (e.g., the control plane DMZ tier 520 of FIG. 5) that can include load balancer (LB) subnet(s) 722 (e.g., LB subnet(s) 522 of FIG. 5), a control plane app tier 724 (e.g., the control plane app tier 524 of FIG. 5) that can include app subnet(s) 726 (e.g., similar to app subnet(s) 526 of FIG. 5), a control plane data tier 728 (e.g., the control plane data tier 528 of FIG. 5) that can include DB subnet(s) 730. The LB subnet(s) 722 contained in the control plane DMZ tier 720 can be communicatively coupled to the app subnet(s) 726 contained in the control plane app tier 724 and to an Internet gateway 734 (e.g., the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 5) and a network address translation (NAT) gateway 738 (e.g., the NAT gateway 538 of FIG. 5). The control plane VCN 716 can include the service gateway 736 and the NAT gateway 738.

The data plane VCN 718 can include a data plane app tier 746 (e.g., the data plane app tier 546 of FIG. 5), a data plane DMZ tier 748 (e.g., the data plane DMZ tier 548 of FIG. 5), and a data plane data tier 750 (e.g., the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g., public Internet 554 of FIG. 5).

The Internet gateway 734 contained in the control plane VCN 716 and contained in the data plane VCN 718 can be communicatively coupled to a metadata management service 752 (e.g., the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively coupled to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
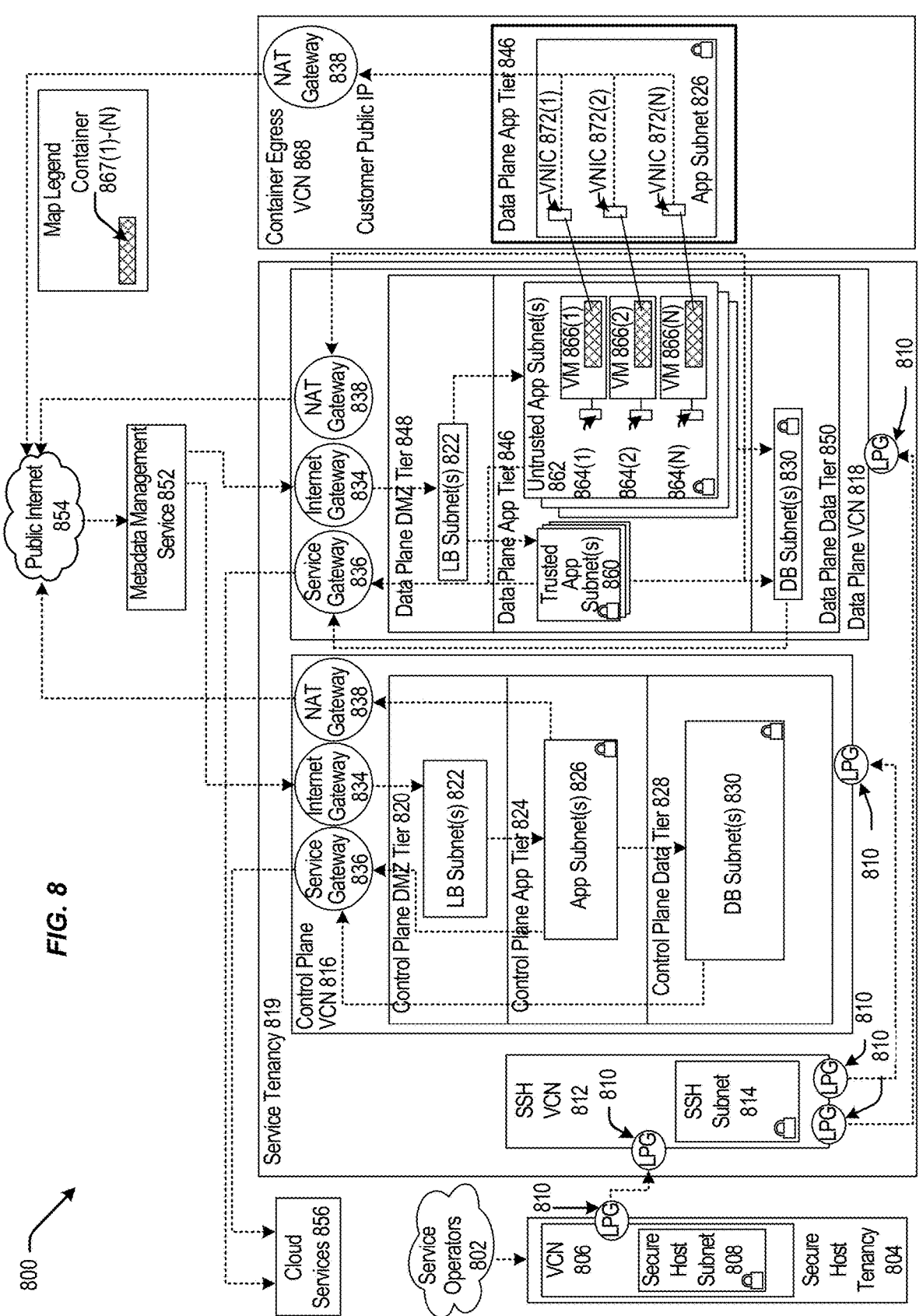
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators

502 of FIG. 5) can be communicatively coupled to a secure host tenancy 804 (e.g., the secure host tenancy 504 of FIG. 5) that can include a virtual cloud network (VCN) 806 (e.g., the VCN 506 of FIG. 5) and a secure host subnet 808 (e.g., the secure host subnet 508 of FIG. 5). The VCN 806 can include an LPG 810 (e.g., the LPG 510 of FIG. 5) that can be communicatively coupled to an SSH VCN 812 (e.g., the SSH VCN 512 of FIG. 5) via an LPG 810 contained in the SSH VCN 812. The SSH VCN 812 can include an SSH subnet 814 (e.g., the SSH subnet 514 of FIG. 5), and the SSH VCN 812 can be communicatively coupled to a control plane VCN 816 (e.g., the control plane VCN 516 of FIG. 5) via an LPG 810 contained in the control plane VCN 816 and to a data plane VCN 818 (e.g., the data plane 518 of FIG. 5) via an LPG 810 contained in the data plane VCN 818. The control plane VCN 816 and the data plane VCN 818 can be contained in a service tenancy 819 (e.g., the service tenancy 519 of FIG. 5).

The control plane VCN 816 can include a control plane DMZ tier 820 (e.g., the control plane DMZ tier 520 of FIG. 5) that can include LB subnet(s) 822 (e.g., LB subnet(s) 522 of FIG. 5), a control plane app tier 824 (e.g., the control plane app tier 524 of FIG. 5) that can include app subnet(s) 826 (e.g., app subnet(s) 526 of FIG. 5), a control plane data tier 828 (e.g., the control plane data tier 528 of FIG. 5) that can include DB subnet(s) 830 (e.g., DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g., the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 5) and a network address translation (NAT) gateway 838 (e.g., the NAT gateway 538 of FIG. 5). The control plane VCN 816 can include the service gateway 836 and the NAT gateway 838.

The data plane VCN 818 can include a data plane app tier 846 (e.g., the data plane app tier 546 of FIG. 5), a data plane DMZ tier 848 (e.g., the data plane DMZ tier 548 of FIG. 5), and a data plane data tier 850 (e.g., the data plane data tier 550 of FIG. 5). The data plane DMZ tier 848 can include LB subnet(s) 822 that can be communicatively coupled to trusted app subnet(s) 860 (e.g., trusted app subnet(s) 760 of FIG. 7) and untrusted app subnet(s) 862 (e.g., untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g., public Internet 554 of FIG. 5).

The Internet gateway 834 contained in the control plane VCN 816 and contained in the data plane VCN 818 can be communicatively coupled to a metadata management service 852 (e.g., the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively coupled to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
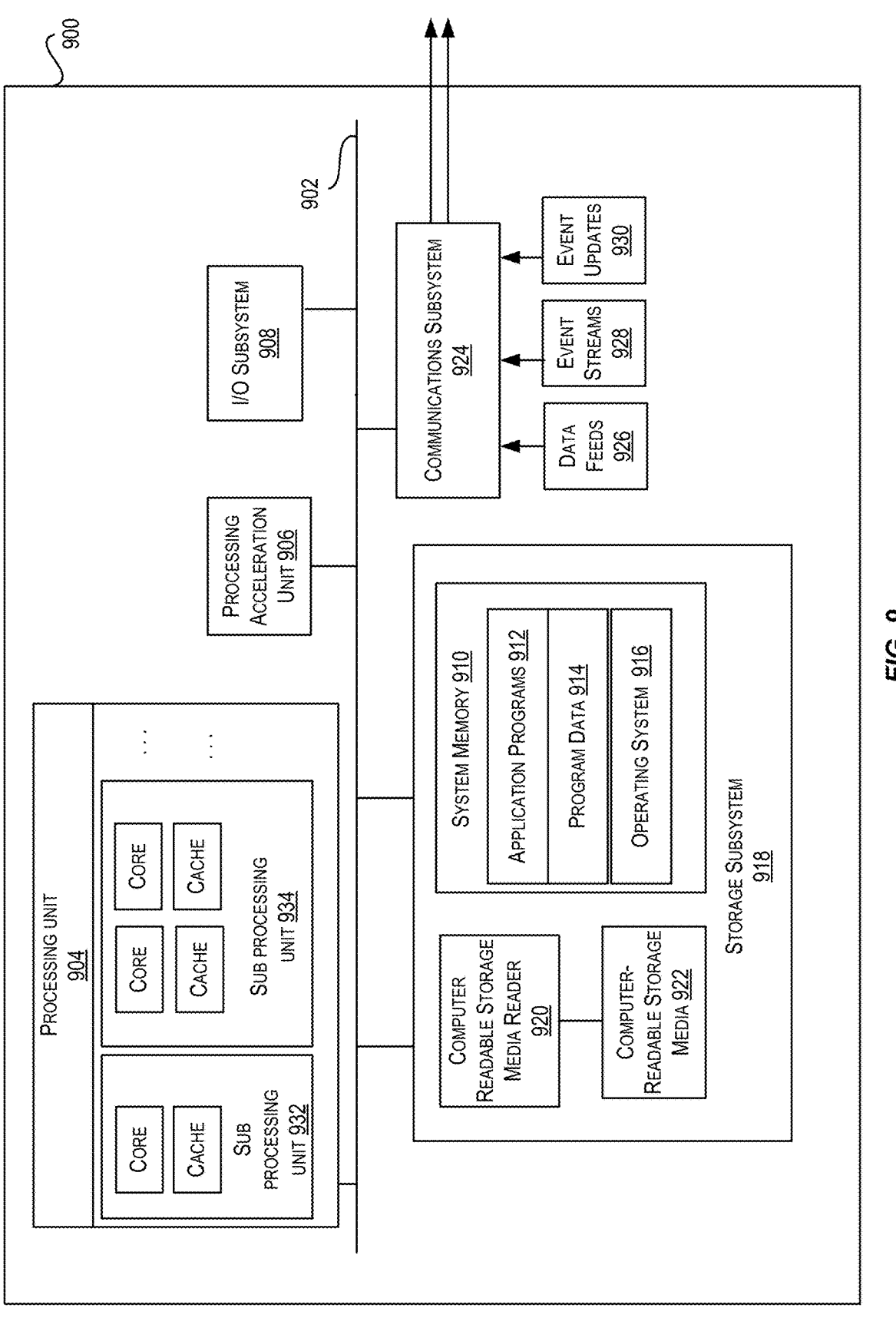
FIG. 9 is a block diagram illustrating an example computer system, according to at least one embodiment.

FIG. 9 illustrates an example computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 904 provide the functionality described above. Storage subsystem 918 may also provide a repository for storing data used in accordance with the present disclosure.

As depicted in the example in FIG. 9, storage subsystem 918 can include various components including a system memory 910, computer-readable storage media 922, and a computer readable storage media reader 920. System memory 910 may store program instructions that are loadable and executable by processing unit 904. System memory 910 may also store data that is used during the execution of the instructions and/or data that is generated during the execution of the program instructions. Various different kinds of programs may be loaded into system memory 910 including but not limited to client applications, Web browsers, mid-tier applications, relational database management systems (RDBMS), virtual machines, containers, etc.

System memory 910 may also store an operating system 916. Examples of operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 900 executes one or more virtual machines, the virtual machines along with their guest operating systems (GOSs) may be loaded into system memory 910 and executed by one or more processors or cores of processing unit 904.

System memory 910 can come in different configurations depending upon the type of computer system 900. For example, system memory 910 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 910 may include a basic input/output system (BIOS) containing basic routines that help to transfer information between elements within computer system 900, such as during start-up.

Computer-readable storage media 922 may represent remote, local, fixed, and/or removable storage devices plus storage media for temporarily and/or more permanently containing, storing, computer-readable information for use by computer system 900 including instructions executable by processing unit 904 of computer system 900.

Computer-readable storage media 922 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Machine-readable instructions executable by one or more processors or cores of processing unit 904 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
performing, by a computing system, a first-type operation of a set of operations to a first crypto key stored in a hardware security module (HSM);
upon completion of the first-type operation to the first crypto key, storing, by the computing system, first state information of the first crypto key resulting from the first-type operation into a first entry of a temporary storage;
generating, by the computing system, a first snapshot based at least in part on content stored in the first entry of the temporary storage, the content stored in the first entry of the temporary storage comprising the first state information of the first crypto key;
generating, by the computing system, a second snapshot based at least in part on content stored in a second entry of the temporary storage; and
adding, by the computing system, a first-type pointer pointing to the first snapshot from the second snapshot to form a linked list.

2. The method of claim 1, wherein the first-type operation is a create operation, and the first state information of the first crypto key is a created state.

3. The method of claim 1, wherein the first-type pointer is a pointer pointing to an immediately preceding snapshot.

4. The method of claim 1, wherein performing the set of operations to a crypto key in the HSM occurs in parallel to generating snapshots based on content stored in entries of the temporary storage.

5. The method of claim 1, wherein the content stored in the second entry of the temporary storage comprises state information of a second crypto key resulting from the first-type operation performed to the second crypto key.

6. The method of claim 1, wherein the content stored in the second entry of the temporary storage comprises second state information of the first crypto key resulting from a second-type operation of the set of operations.

7. The method of claim 6, wherein the second-type operation is a delete operation and the second state information of the first crypto key is a deleted state.

8. The method of claim 6, further comprising adding a second-type pointer pointing to the first snapshot from the second snapshot based at least in part on determining that the second state information of the first crypto key exists in the second snapshot.

9. The method of claim 1, wherein the first crypto key in the first snapshot is protected by a multi-level security boundary.

10. The method of claim 9, wherein the multi-level security boundary comprises a unique key for encrypting the first crypto key and a specific geographic partition.

11. The method of claim 9, further comprising restoring the first crypto key from the first snapshot by using the multi-level security boundary.

12. The method of claim 11, further comprising performing a validation on the restored first crypto key by decrypting an encrypted constant string in a payload of the first crypto key.

13. The method of claim 1, further comprising performing a checksum validation on the first snapshot after generating the first snapshot based at least in part on the content stored in the first entry of the temporary storage.

14. A non-transitory computer-readable medium storing computer-executable instructions that, when executed by one or more processors, cause the one or more processors to perform operations comprising:
performing a first-type operation of a set of operations to a first crypto key stored in a hardware security module (HSM), the first-type operation being a create operation;
upon completion of the first-type operation to the first crypto key, storing first state information of the first crypto key resulting from the first-type operation into a first entry of a temporary storage, the first state information of the first crypto key being a created state;
generating a first snapshot based at least in part on content stored in the first entry of the temporary storage, the content stored in the first entry of the temporary storage comprising the first state information of the first crypto key;
generating a second snapshot based at least in part on content stored in a second entry of the temporary storage; and
adding a first-type pointer pointing to the first snapshot from the second snapshot to form a linked list, the first snapshot being immediately preceding the second snapshot.

15. The non-transitory computer-readable medium of claim 14, wherein performing the set of operations to a crypto key in the HSM occurs in parallel to generating snapshots based on content stored in entries of the temporary storage.

16. The non-transitory computer-readable medium of claim 14, further comprising adding a second-type pointer pointing to the first snapshot from the second snapshot based at least in part on determining that the content stored in the second entry of the temporary storage is second state information of the first crypto key resulting from a second-type operation of the set of operations;

wherein the second-type operation is a delete operation and the second state information of the first crypto key is a deleted state.

17. The non-transitory computer-readable medium of claim 14, wherein the first crypto key in the first snapshot is protected by a multi-level security boundary, and wherein the multi-level security boundary comprises a unique key for encrypting the first crypto key and a specific geographic partition.

18. A computing system, comprising:

one or more processors; and one or more computer readable media storing computer-executable instructions that, when executed by the one or more processors of the computing system, cause the computing system to:

perform, by the computing system, a first-type operation of a set of operations to a first crypto key stored in a hardware security module (HSM), the first-type operation being a create operation;

upon completion of the first-type operation to the first crypto key, store, by the computing system, first state information of the first crypto key resulting from the first-type operation into a first entry of a temporary storage, the first state information of the first crypto key being a created state;

generate, by the computing system, a first snapshot based at least in part on content stored in the first entry of the temporary storage, the content stored in the first entry of the temporary storage comprising the first state information of the first crypto key;

generate, by the computing system, a second snapshot based at least in part on content stored in a second entry of the temporary storage; and add, by the computing system, a first-type pointer pointing to the first snapshot from the second snapshot to form a linked list, the first snapshot being immediately preceding the second snapshot.

19. The system of claim 18, wherein performing the set of operations to a crypto key in the HSM occurs in parallel to generating snapshots based on content stored in entries of the temporary storage.

20. The system of claim 18, wherein the computing system is further caused to add a second-type pointer pointing to the first snapshot from the second snapshot based at least in part on determining that the content stored in the second entry of the temporary storage is second state information of the first crypto key resulting from a second-type operation of the set of operations;

wherein the second-type operation is a delete operation and the second state information of the first crypto key is a deleted state.

\* \* \* \* \*